US011912551B2

(12) United States Patent
Martin

(10) Patent No.: US 11,912,551 B2
(45) Date of Patent: Feb. 27, 2024

(54) FORKLIFT ATTACHMENT

(71) Applicant: Bradley Martin, Clermont, FL (US)

(72) Inventor: Bradley Martin, Clermont, FL (US)

( * ) Notice: Subject to any disclaimer, the term of this patent is extended or adjusted under 35 U.S.C. 154(b) by 150 days.

(21) Appl. No.: 17/424,588

(22) PCT Filed: Feb. 3, 2020

(86) PCT No.: PCT/US2020/016418
§ 371 (c)(1),
(2) Date: Jul. 21, 2021

(87) PCT Pub. No.: WO2020/160547
PCT Pub. Date: Aug. 6, 2020

(65) Prior Publication Data

US 2022/0098016 A1 Mar. 31, 2022

Related U.S. Application Data

(60) Provisional application No. 62/800,026, filed on Feb. 1, 2019.

(51) Int. Cl.
*B66F 9/18* (2006.01)
*B66F 9/16* (2006.01)

(52) U.S. Cl.
CPC . *B66F 9/18* (2013.01); *B66F 9/16* (2013.01)

(58) Field of Classification Search
CPC .................................... B66F 9/16; B66F 9/18
See application file for complete search history.

(56) References Cited

U.S. PATENT DOCUMENTS

| | | | | |
|---|---|---|---|---|
| 2,846,102 A | | 8/1958 | Connor | |
| 2,873,873 A | | 2/1959 | Fowler | |
| 2,941,683 A | | 6/1960 | Fowler | |
| 3,705,658 A | | 12/1972 | Harris | |
| 4,212,478 A | | 7/1980 | McGrath, Jr. | |
| 4,272,220 A | * | 6/1981 | Garcia | B66F 9/187 294/90 |
| 5,009,565 A | * | 4/1991 | Esau | B66F 9/187 414/421 |
| 5,056,982 A | | 10/1991 | Stockham | |
| 5,496,147 A | * | 3/1996 | Taube | B66F 9/187 294/90 |
| 2002/0110446 A1 | | 8/2002 | Smith | |

(Continued)

FOREIGN PATENT DOCUMENTS

| | | |
|---|---|---|
| AU | 2012202987 A1 | 1/2013 |
| EP | 1038826 A1 | 9/2000 |

*Primary Examiner* — Jonathan Snelting
(74) *Attorney, Agent, or Firm* — Boudwin Intellectual Property Law, LLC; Daniel Boudwin

(57) ABSTRACT

A forklift attachment is shown and described. The forklift attachment, has a mounting sleeve which includes a base, at least one sidewall, and an open end. The mounting sleeve fits and slides over a tine of a forklift. A plurality of braces is disposed along a top surface of the mounting sleeve defining a channel which extends parallel to, and forward from, the mounting sleeve. The channel includes a first end and a second end and an elongated rod is pivotally secured to the plurality of braces at the second end of the channel. The elongated rod extends parallel to, and forward from, the plurality of braces. A lock selectively secures the elongated rod in a position parallel to the tine of the forklift.

13 Claims, 4 Drawing Sheets

(56) References Cited

U.S. PATENT DOCUMENTS

| | | | |
|---|---|---|---|
| 2005/0019144 | A1 | 1/2005 | Neria |
| 2014/0262627 | A1 | 9/2014 | Balcom |
| 2015/0259182 | A1 | 9/2015 | Lind |

* cited by examiner

FORKLIFT ATTACHMENT

CROSS REFERENCE TO RELATED APPLICATIONS

This application claims the benefit of International Application No. PCT/US2016418 filed on Feb. 3, 2020, which claims the benefit of U.S. Provisional Application No. 62/800,026 filed on Feb. 1, 2019. The above identified patent applications are herein incorporated by reference in their entirety to provide continuity of disclosure.

FIELD OF THE INVENTION

The present invention relates to forklift accessories and attachments. More particularly, the present invention provides for a forklift attachment that is utilized to manipulate rolls of material via the central bore of the roll.

BACKGROUND OF THE INVENTION

Many people have heavy and large rolled goods, such as sheet vinyl, carpets, and paper, delivered to them. Transportation companies often deliver such heavy rolled goods by positioning the goods in a horizontal position on their trucks. Once the transportation company arrives at their destination with the goods, the goods often need to be moved and stored in a vertical position to maximize the storage space and to prevent damage to the goods Additionally, manufacturers themselves need to move their produced goods into storage and staging areas in preparation for deliveries. Lifting and transporting such heavy rolled items can be difficult or near impossible without machinery. The process of moving such goods often requires more than one person. Tying up multiple people to transport such goods is not cost effective. Additionally, work related injuries can result from manually moving such heavy and awkward goods. Such injuries often result in employees filing workers compensation claims, which can hurt a company's bottom line.

Often, companies utilize forklifts to transport large and heavy goods. Forklifts enable an individual to load a large, and potentially heavy and awkward assortment of goods, typically via pallets. Ordinarily an employee stacks such goods on a pallet; the pallets having orifices in which a forklift operator may insert the tines of the forklift. The forklift elevates the pallet and drives the pallet to the desired location. Forklifts are not an ideal mechanism for transporting rolled goods without a pallet as the goods tend to roll off the tines of the forklift. Therefore, a forklift attachment that enables a forklift operator to secure a rolled good through the central bore of the rolled good, thereby enabling the forklift operator to not only transport, the rolled good, but also to manipulate the orientation of the rolled good between horizontal and vertical, is desired.

Devices in the known art have several drawbacks. Some forklift attachments allow a forklift operator to secure the rolled goods to the forklift, but do not provide a mechanism to allow the orientation of the rolled good to be transitioned between horizontal and vertical orientations.

The present invention substantially diverges in design elements from the known art and consequently it is clear that there is a need in the art for an improvement to existing forklift attachments. In this regard the present invention substantially fulfills these needs.

SUMMARY OF THE INVENTION

In view of the foregoing disadvantages inherent in the known types of forklift attachments now present in the prior art, the present invention provides a forklift attachment wherein the same can be utilized for providing convenience for the user when transporting and reorienting a rolled good. The present forklift attachment comprises a mounting sleeve which includes a base, at least one sidewall, and an open end. The mounting sleeve fits and slides over one or both tines of a forklift via the open end, depending on the model desired. A plurality of braces is disposed along a top surface of the mounting sleeve which define a channel. The channel extends parallel to, and forward from, the mounting sleeve. The channel includes a first end and a second end and an elongated rod is pivotally secured to the plurality of braces at the second end of the channel. The elongated rod extends parallel to, and forward from, the plurality of braces. A lock disposed in the channel, which selectively secures the elongated rod in a position parallel to the tine of the forklift. The forklift attachment is used to transport rolls of material via utilization of a central bore of the rolls.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
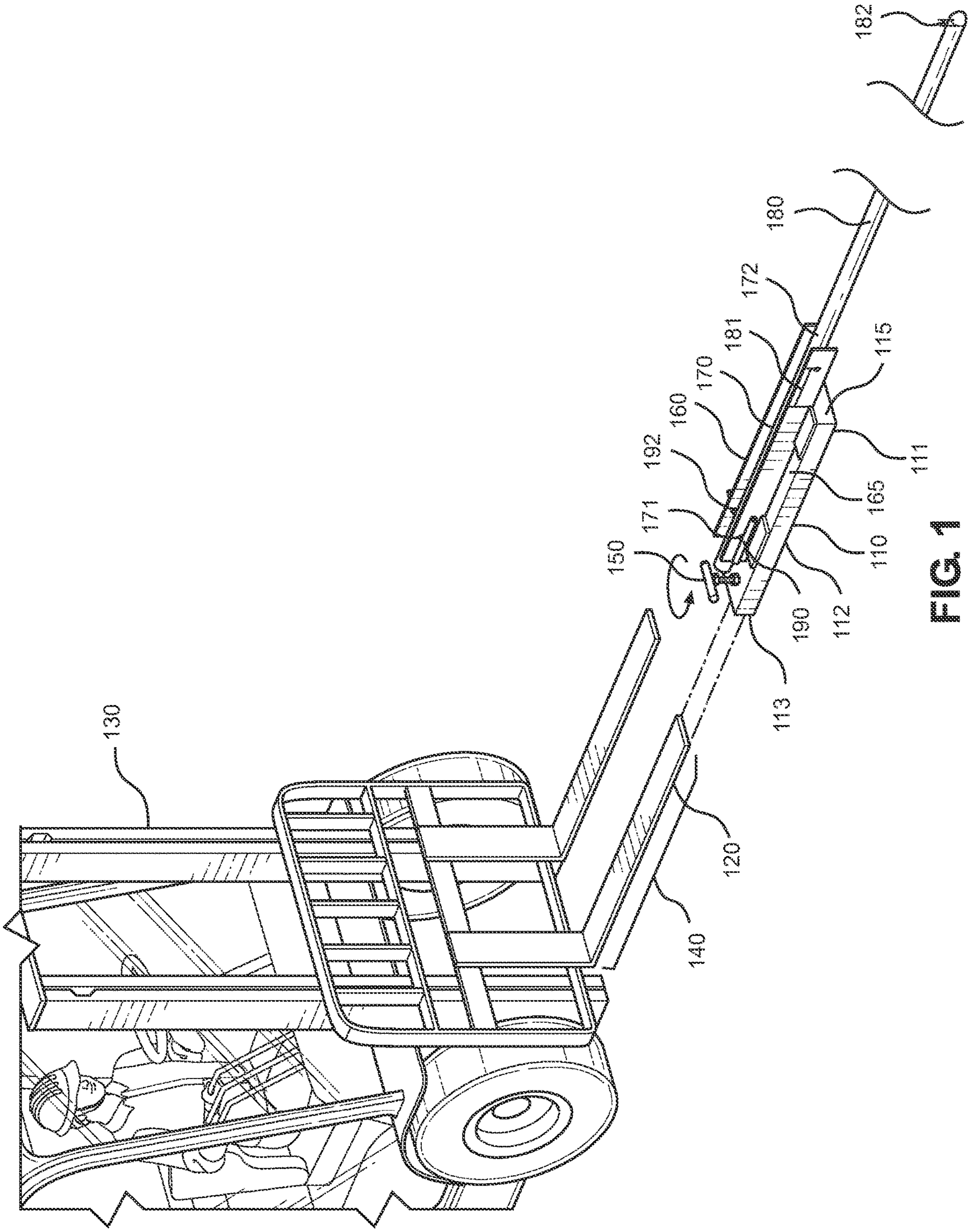
FIG. 1 shows a perspective view of an embodiment of the forklift attachment.

Reference is made herein to the attached drawings. Like reference numerals are used throughout the drawings to depict like or similar elements of the forklift attachment. For the purposes of presenting a brief and clear description of the present invention, a preferred embodiment will be discussed as used for the forklift attachment. The figures are intended for representative purposes only and should not be considered to be limiting in any respect.

Referring now to FIG. 1, there is shown a perspective view of an embodiment of the forklift attachment. The forklift attachment comprises a mounting sleeve 110 which includes a base 111, at least one sidewall 112, and an open end 113. In one embodiment, the open end 113 of the mounting sleeve 110 is sized to receive a singular tine 120 of a forklift 130. In such an embodiment, the mounting sleeve 110 is hollow and the interior portion defined by the base 111 and at least one sidewall 112 is adapted to receive at least a portion of one tine 120 of a forklift 130. The mounting sleeve 110 is configured to slidably receive a tine 120 of a forklift 130 via the open end 113. In a further embodiment, the mounting sleeve 110 is sized to fit over a portion of a length 140 of a tine 120 of a forklift 130.

In the shown embodiment, the mounting sleeve 110 further comprises a screw 150 disposed towards the open end 113 of the mounting sleeve 110, configured to removably secure against the tine 120 of the forklift 130. A threaded channel is disposed in the sidewall 112 configured to receive a complementary threaded screw 150. When the tine 120 of the forklift is received by the mounting sleeve 110, a user is able to rotate the screw 150 into the threaded channel of the sidewall 112 in order to compress the screw 150 against tine 120. In such a manner, the user is able to secure the mounting sleeve 110 to the tine 120 of the forklift 130. In the shown embodiment, the screw 150 is in the shape of a "T" in order to provide an easier grip for a user and eliminate the need for specialized tools to tighten and release the screw 150. In some embodiments, a chain is attached to the base 111 which can be utilized to further secure the mounting sleeve 110 to the forklift.

A plurality of braces 160 are disposed along a top surface 165 of the mounting sleeve 110. In one embodiment, the plurality of braces is disposed along a length of the mounting sleeve 110. The plurality of braces 160 define a channel 170 which extends parallel to, and forward from, the top surface 165 of the mounting sleeve 110. The channel 170 includes a first end 171 and a second end 172. In the shown embodiment, the first end 171 and a proximate position of the second end 172 is secured to the mounting sleeve 110. In such an embodiment the channel 170 extends beyond a closed end 115 of the mounting sleeve 110. In this manner, the majority of the channel 170 resides above the top surface 165 of the mounting sleeve 110 and a portion of the channel 170 extends beyond the mounting sleeve 110.

In the shown embodiment, a width of the channel 170 is sized to receive an elongated rod 180. In various embodiments, the elongated rod 180 is composed of various materials including metals and alloys. In further embodiments, the materials include different levels of steel. The elongated rod 180 is pivotally secured to the plurality of braces 160 at the second end 172 of the channel 170. The elongated rod 180 is configured to pivot at the securement point and in such a manner is able to be rotated from horizontal to vertical relative to the mounting sleeve 110. The elongated rod 180 is pivotally secured beyond the closed end 115 of the mounting sleeve 110 such that the elongated rod 180 has the freedom of motion to be rotated from a horizontal to a vertical orientation. In one embodiment, a distance 181 between a point at which the elongated rod 180 is pivotally secured to the plurality of braces 160 and the closed end 115 of the mounting sleeve 110 is greater than a radius 182 of the elongated rod 180. In another embodiment, a distance 181 between a point at which the elongated rod 180 is pivotally secured to the plurality of braces 160 and the dosed end 115 of the mounting sleeve 110 is greater than a diameter of the elongated rod 180.

In various embodiments, the elongated rod 180 is able to support a variety of weights and lengths of rolled goods. In one embodiment, the elongated rod 180 is able to support up to 1,800 pounds and roiled goods up to 12 feet long. In another embodiment, the elongated rod 180 is able to support up to 900 pounds and rolled goods up to two meters long, in another embodiment, the elongated rod 180 is able to support up to 750 pounds and rolled goods up to two meters long. In alternative embodiments, cross members can be added to the base to handle heavier loads and account, for additional stress put on the device. In a further embodiment, the base can be up to forty-eight inches wide, depending on weight requirements.

A lock 190 is disposed in the channel 170, configured to selectively secure the elongated rod 180 in a position parallel to the tine 120 of the forklift 130. In one embodiment, the lock 190 is configured to secure the elongated rod 180 within the channel 170 and prevent movement of the elongated rod 180 therein. The lock 190 ensures that the elongated rod 180 is held in a stable position and ensures that the elongated rod 180 does not pivot when so secured. In the shown embodiment the lock 190 further comprises a locking pin and locking pin apertures 192 disposed on the braces 160 and elongated rod 180. The locking pin apertures 192 are configured to receive the locking pin 191 therethrough, in this manner, a user is able to line up and pass the locking pin 191 through the locking pin apertures 192 in the braces 160 and the corresponding locking pin aperture 192 in the elongated rod 180. The locking pin 391 is removably securable to the braces 160 thereby allowing a user to easily lock and unlock the elongated rod 180 in a stable position or enabling the elongated rod 180 to pivot. In the shown embodiment, the locking pin 191 is shaped as a "T" in order to prevent the pin from sliding out of the locking pin apertures 192. In various embodiments, the locking pin 191 is a variety of shapes, such as a "C", "U", or "L" and also includes various types of fasteners such as carabiners, nuts and bolts, and the like.

Figure 2:
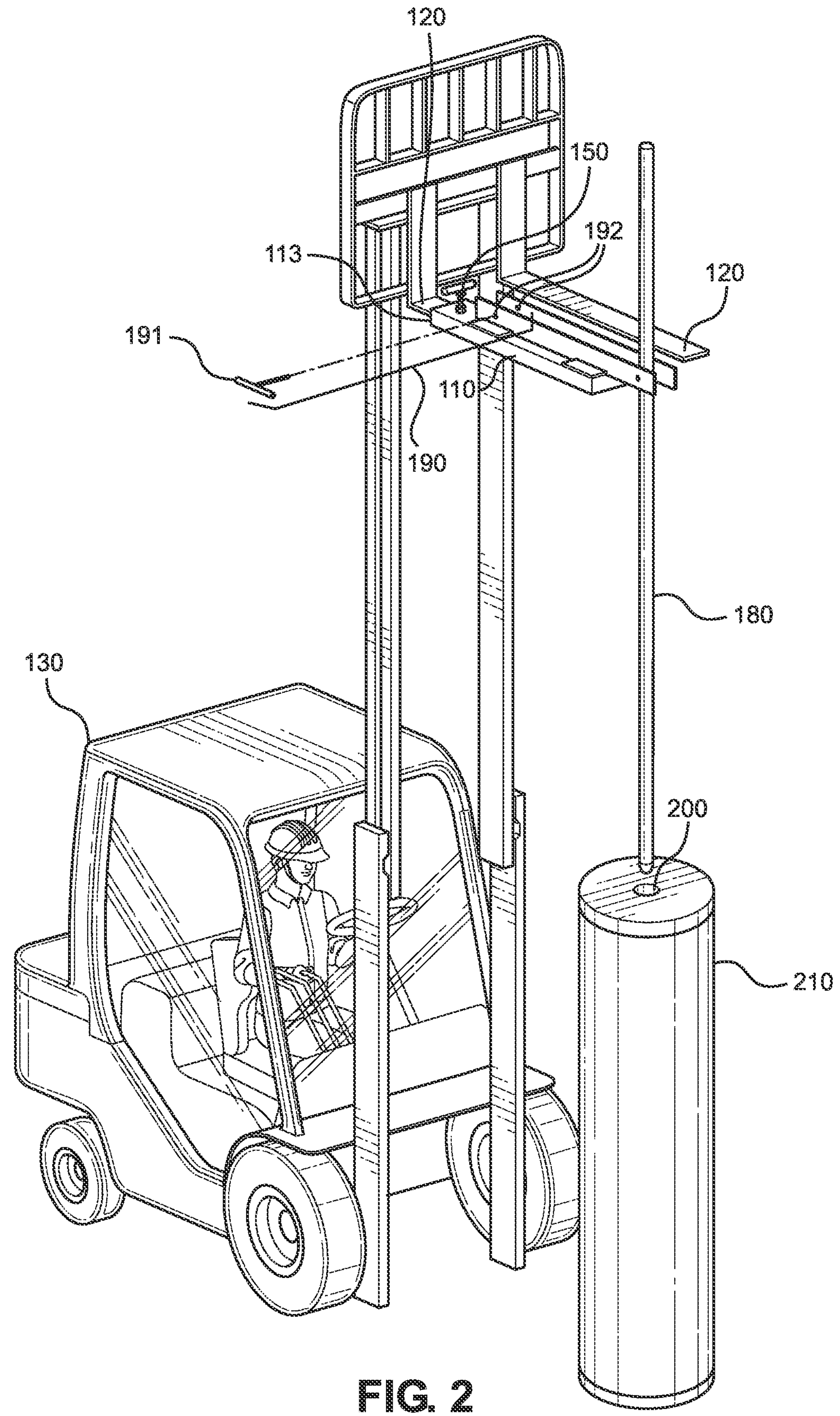
FIG. 2 shows a perspective view of an embodiment of the forklift attachment in use, with a focus on the insertion of the elongated rod into a central bore.

Referring now to FIG. 2, there is shown a perspective view of an embodiment of the forklift attachment in use, with a focus on the insertion of the elongated rod into a central bore. In the shown embodiment, a rolled good 210 is in a vertical orientation. Although the present disclosure will show how the forklift attachment is used to manipulate the rolled good 210 in a vertical orientation, one of ordinary skill in the art will understand how the forklift attachment can be used to manipulate the rolled good 210 in a variety of orientations, as further detailed below, in use, an individual can slide the open end 113 of the mounting sleeve 110 over a tine 120 of a forklift 130. A user is then able to unlock an elongated rod 180 by operation of the lock 190 to enable the elongated rod 180 to pivot between a vertical and horizontal position. In the shown embodiment, the lock 190 is comprised of a locking pin 191 passed through locking pin apertures 192 disposed in braces and the elongated rod 180. In such an embodiment, by removing the locking pin 191, the elongated rod 180 is able to pivot between a horizontal and a vertical orientation relative to the ground surface. A user is then able to position the elongated rod 180 in a vertical orientation above the central bore 200 of a rolled good 210. The elongated rod 180 is then lowered into the central bore 200 of the rolled good 210.

Figure 3:
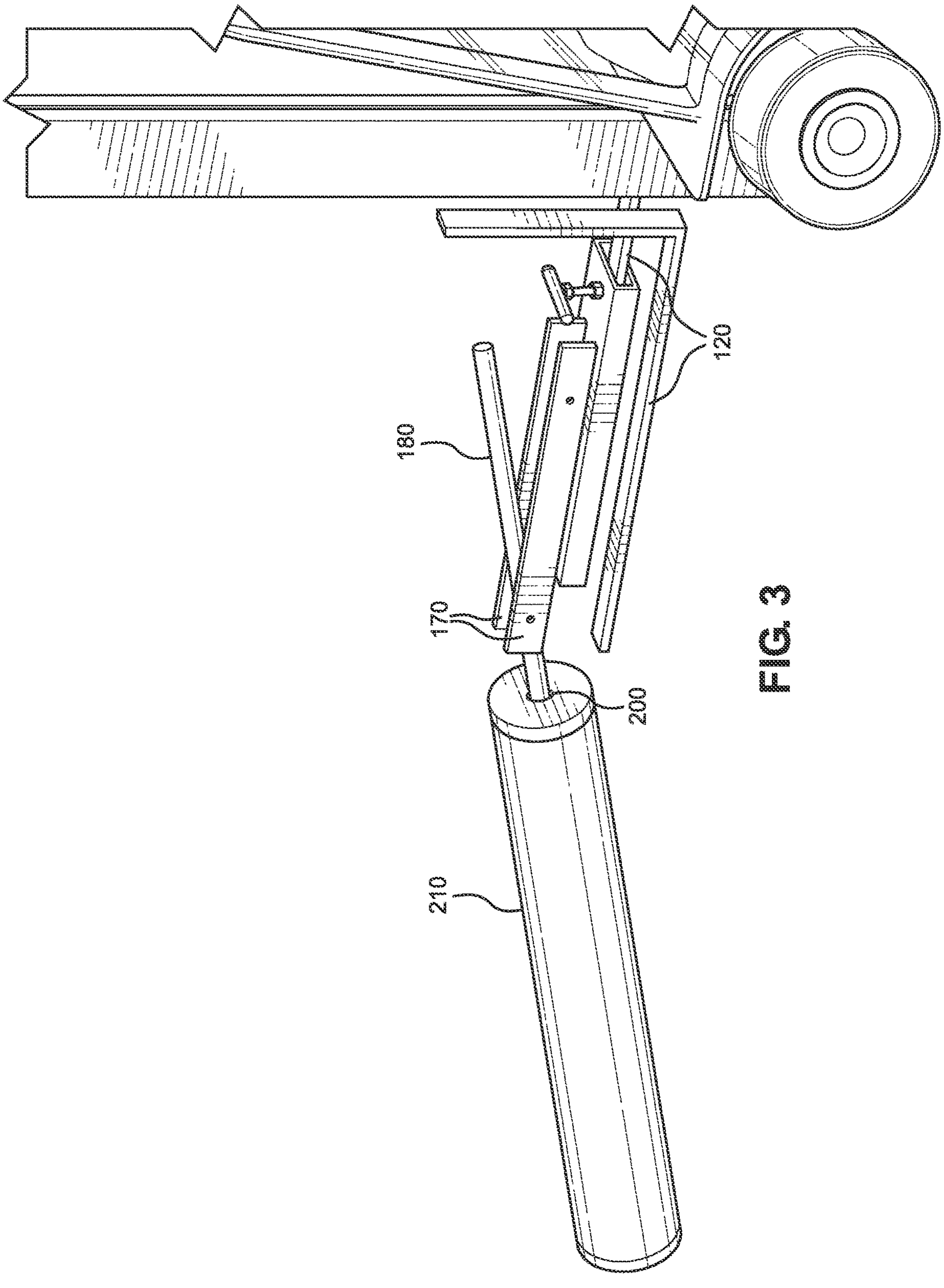
FIG. 3 shows a perspective view of an embodiment of the forklift attachment in use, with a focus on re-orienting a rolled good.

Referring now to FIG. 3, there is shown a perspective view of an embodiment of the forklift attachment in use, with a focus on re-orienting a rolled good. The roiled good 210 can be transported by the forklift 130 and stored either in a horizontal position or returned to a vertical position. In this manner, the forklift attachment is used to transport roils of material via utilization of a central bore of the rolls. Once a rolled good 210 is engaged via the central bore 200 by the elongated rod 180, a user is able to manipulate the orientation of the rolled good 210 by rotation and elevation of the elongated rod 180. As the elongated rod 180 is operably secured to a tine 120 of a forklift, a user is able to operate the forklift to move the tine 120 vertically. Because the elongated rod 180 is pivotally attached to the brace, as the tine 120 moves up and down, the angle of the elongated rod 180 changes. For example, in the shown embodiment, the rolled good 210 started in an upright and vertical position with the elongated rod 180 disposed in the central bore 200 of the rolled good 210. The user is able to drive the forklift backward and lower the tine 120 of the forklift 130 to rotate and manipulate the rolled good 210 towards a horizontal position. Once the roiled good 210 is in a horizontal position, the lock 190 can be engaged to lock the position of the elongated rod 180 in the channel 170. At this point the roiled good 210 can be transported by the forklift and stored either in a horizontal position or returned to a vertical position, in this manner, the forklift attachment is used to transport rolls of material via utilization of a central bore of the roils. In one embodiment, a release mechanism can remotely release the lock. In a further embodiment, the release mechanism can be disposed in the cab of the forklift. In another embodiment, the release mechanism can operate wirelessly, such that cables will not interfere with the operation of the device.

Figure 4:
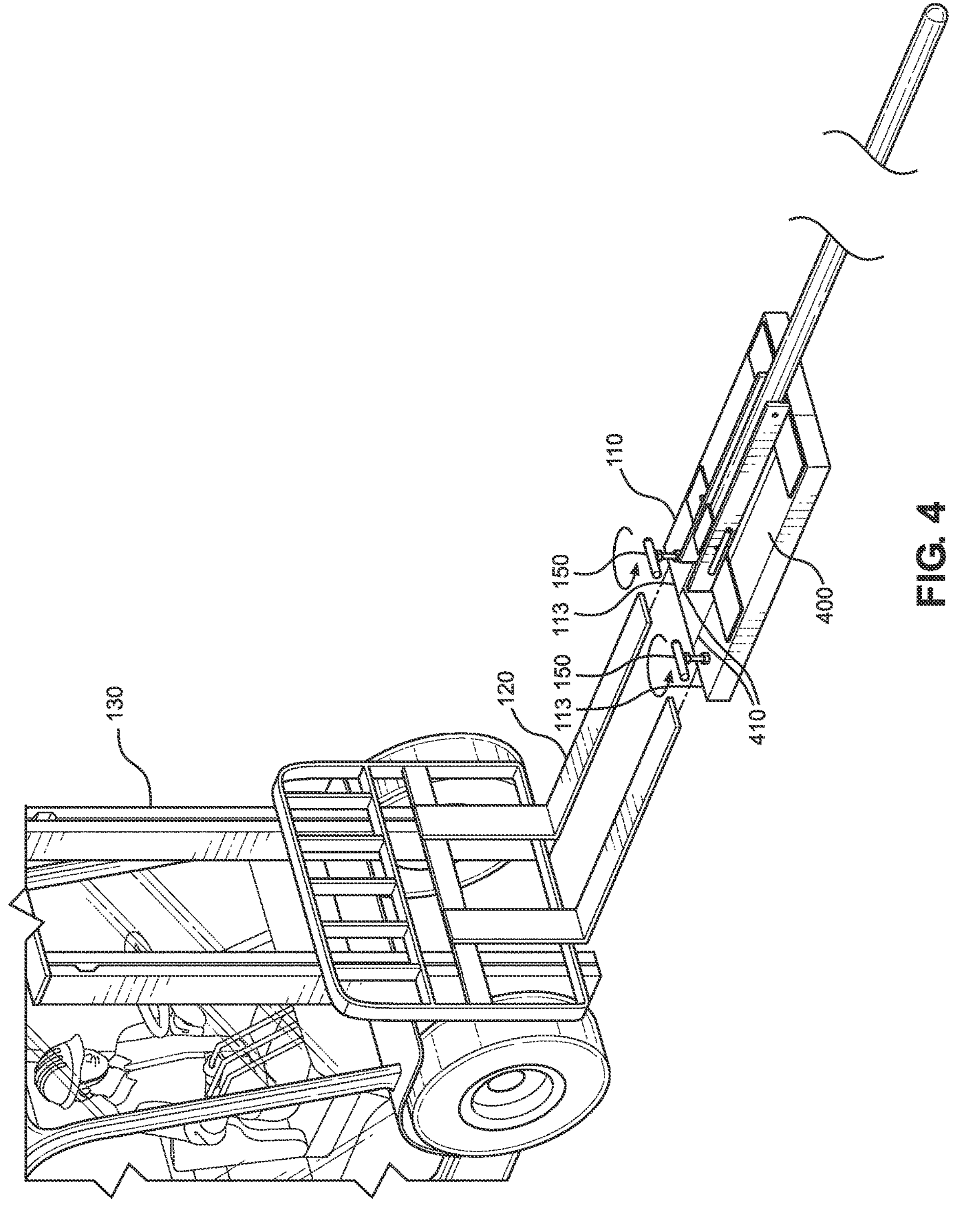
FIG. 4 shows a perspective view of an embodiment of the forklift attachment secured by two tines of the forklift.

Referring now to FIG. 4, there is shown a perspective view of an embodiment of the forklift attachment secured by two tines of the forklift. In the shown embodiment, the open end 113 of the mounting sleeve 110 is sized to receive a plurality of tines 120 of a forklift 130 via the open end 113. In a further embodiment, the mounting sleeve 110 includes a plurality of interior portions 400, wherein each interior portion is adapted to receive a portion of one tine 120 of a forklift 130. In this manner, the entire mounting sleeve 110 is configured to slidably receive a plurality of tines 120 of a forklift 330 via the open end 113. In some embodiments, the open end 113 of the mounting sleeve 110 fits over multiple tines 120 of the forklift 130. In further embodiments, each tine 120 of the forklift 130 fits within separate interior portions of the mounting sleeve 110 and the mounting sleeve 110 includes a plurality of open ends 113 that are subdivided by interior braces 410. Once the mounting sleeve 110 is disposed over the tine 120 of the forklift 130, a user is able to secure the mounting sleeve 110 in place by tightening screws 150 against the tine 120 of the forklift 130.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and ail equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, ail suitable modifications and equivalents may be resorted to, falling within the scope of the invention.

I claim:

1. A forklift attachment for a forklift (130) with at least one operable tine (120) having a length (140), comprising:

a mounting sleeve (110), including a base (111), at least one sidewall (112), a top surface (165), a proximal sleeve open end (113) and a distal sleeve end (115);

the mounting sleeve (110) configured to slidably receive the tine (120) of the forklift (130) via the sleeve open end (113) and securable thereat;

two braces (160) disposed in parallel along the top surface (165) of the mounting sleeve (110) and extending beyond the distal sleeve end (115);

the braces (160) and the top surface (165) define a channel (170), wherein the channel (170) is sized to receive an elongated rod (180);

the channel (170) includes a first proximal end (171) and a second distal end (172);

the elongated rod (180) is pivotally secured to the braces (160) of the channel (170) beyond the distal sleeve end; and a releasable lock (190) disposed on the braces (160) proximal to the channel (170) first proximal end (171), configured to selectively secure the elongated rod (180) in a position parallel to the tine (120) of the forklift (130) and within the channel (170) when the lock is engaged, and to allow the elongate rod (180) to pivot into vertical position when the lock (190) is disengaged.

2. The forklift attachment of claim 1 wherein the releasable lock (190) further comprises a removable locking pin (191) alignable and insertable into locking apertures (192) disposed on the braces (160) and the elongated rod (180).

3. The forklift attachment of claim 1 wherein the sleeve (190) further comprises a second sidewall.

4. The forklift attachment of claim 1, wherein the mounting sleeve (110) is sized to fit over the entire length of the tine (120) of the forklift (130).

5. The forklift attachment of claim 1 wherein the mounting sleeve (110) is sized to fit over a length (140) of a forklift (130) mounting tine (120).

6. The forklift attachment of claim 1 wherein the braces (160) which define the channel (170) extend forward from the mounting sleeve (11).

7. The forklift attachment of claim 1, wherein the distal sleeve end (115) is closed.

8. The forklift attachment of claim 1, wherein a mounting distance (181) between a point at which the elongated rod (180) is pivotally secured to the braces (160) and the distal end (115) of the mounting sleeve (110) is greater than a radius (182) of the elongated rod (180).

9. The forklift attachment of claim 1, wherein a mounting distance (181) between a point at which the elongated rod (180) is pivotally secured to the braces (160) and the distal end (115) of the mounting sleeve (110) is greater than a diameter (183) of the elongated rod (180).

10. The forklift attachment of claim 1, wherein the elongated rod (180) can pivot vertically to approximately ninety degrees.

11. The forklift attachment of claim 1, wherein the elongated rod (180) cannot pivot upwardly beyond the channel.

12. The forklift attachment of claim 1, wherein a release disposed in a cockpit of the forklift (130) is able to release the elongated rod (180) from the lock (190).

13. The forklift attachment of claim 1, further wherein the mounting sleeve (110) is configured to slidably receive two tines (120) of the forklift (130) via the sleeve open end (113) and securable thereat.

* * * * *